3,297,369
METHOD AND APPARATUS FOR INTRODUCING PARTICULATE MATERIAL INTO A PNEUMATIC CONVEYING SYSTEM
Jean-Paul Vandenhoeck, New York, N.Y., assignor to Buell Engineering Company, Inc., Lebanon, Pa., a corporation of Delaware
Filed Dec. 17, 1964, Ser. No. 419,056
15 Claims. (Cl. 302—36)

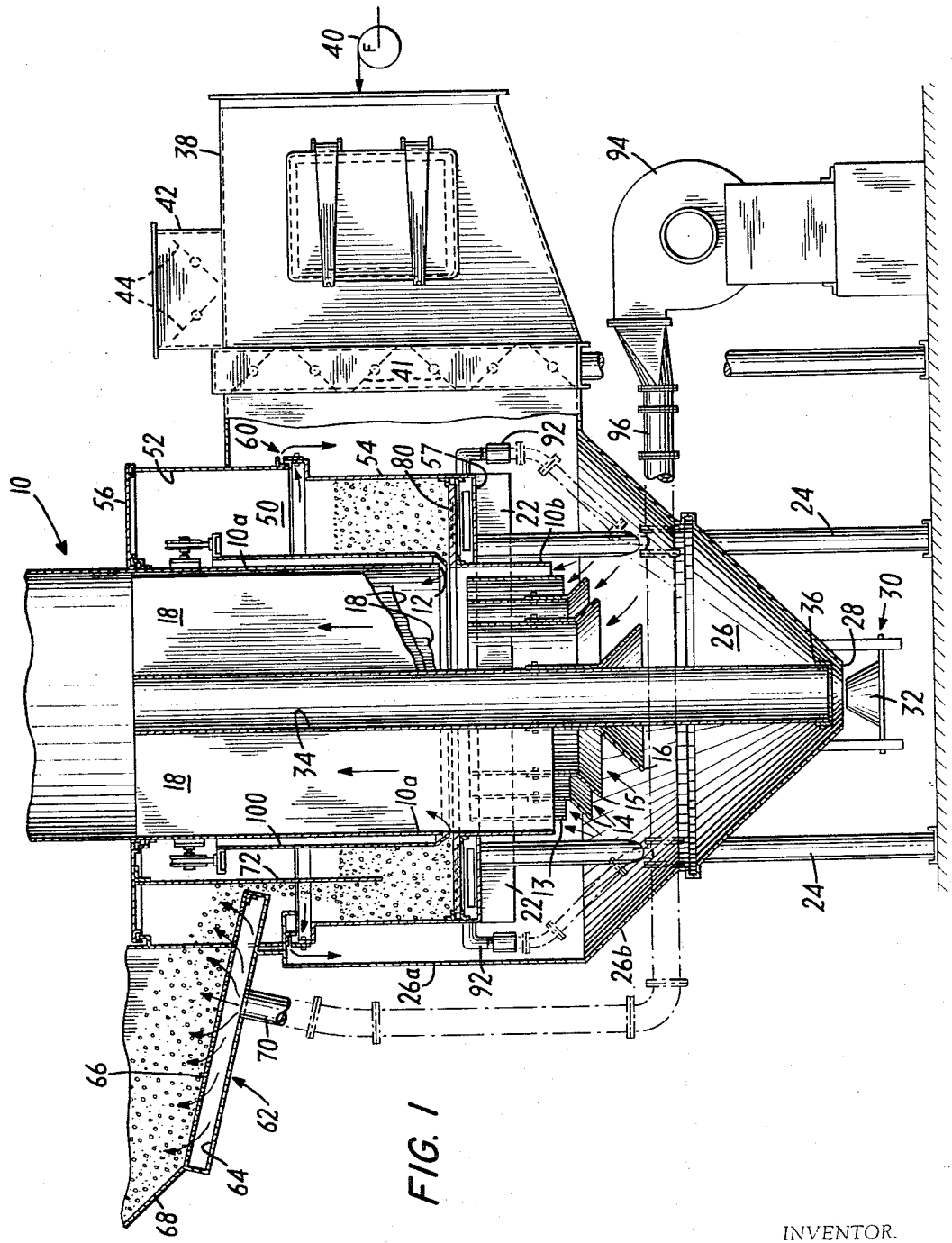

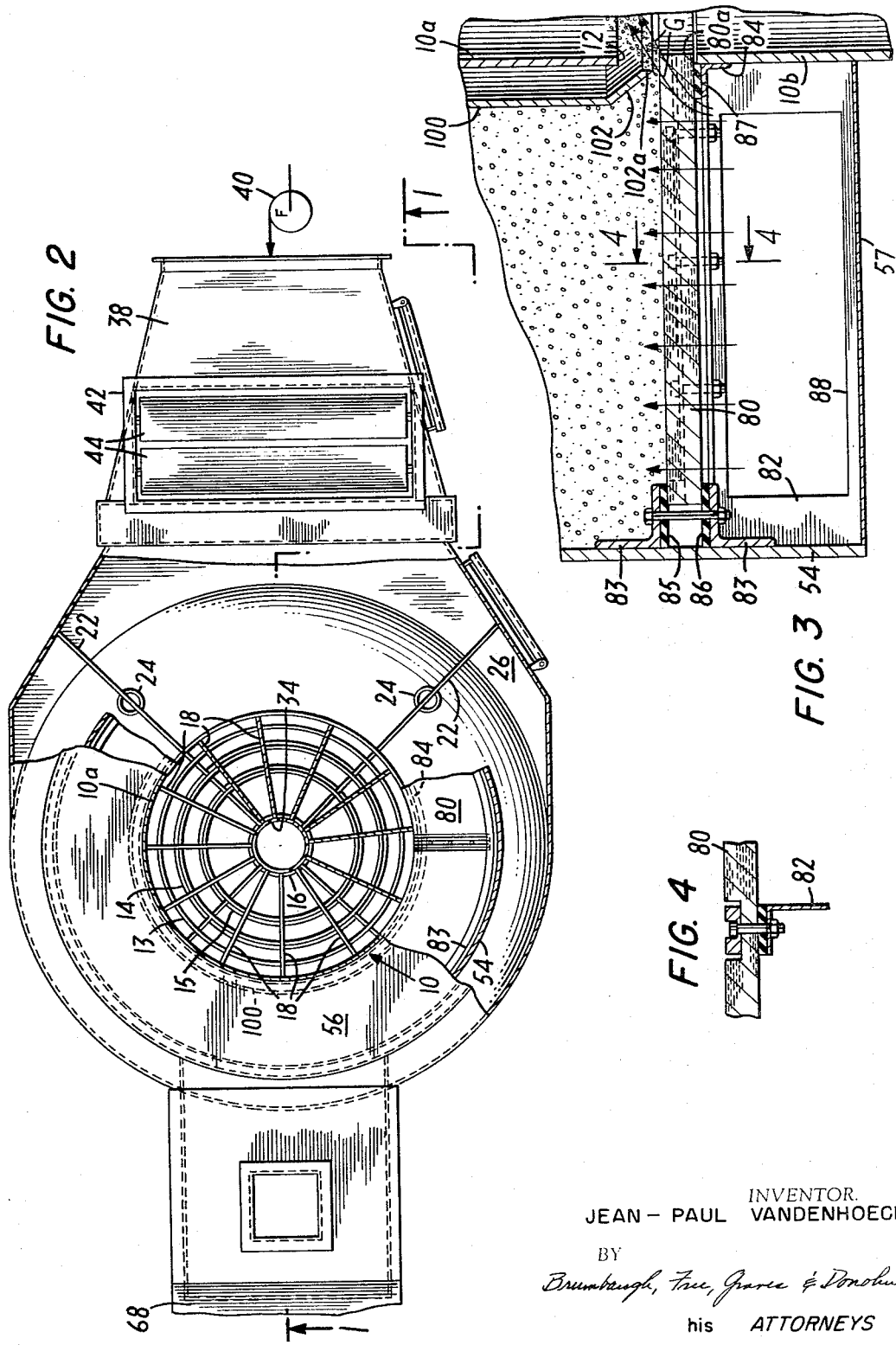

This invention relates to the pneumatic conveying of particulate material and, more particularly, to a novel and improved method and apparatus for introducing particulate material into conveying gas flowing upwardly in a generally vertically disposed conduit.

The usual way of introducing particulate material into an elevating pneumatic conveying system is to discharge it into the conveying conduit by gravity through one or more openings therein. Gravity discharge necessarily involves a substantial downward component of initial velocity of the material, so that the material must first be decelerated and stopped and then accelerated upwardly. This of course requires significant energy. Moreover, the particles tend to cluster together in groups as they are introduced, thus creating a high proportion of voids through which the conveying gas can pass without picking up any particles and causing high losses and undesirable turbulences in the conveying gas. Often, the material falls a considerable distance before being picked up in the conveying gas flow. These and other problems with gravity supply increase markedly with increases in conveying conduit cross-section.

The problems of gravity discharge can be minimized only by increasing the flow rate and the velocity of the conveying gas and the particle acceleration distance. However, the power requirements and the size of the equipment are substantially increased by these expedients; moreover, the higher velocity and flow rate creates even higher turbulences in the region where the particulate material is accelerated and causes collisions between the particles to an extent that high proportions of the available energy are lost, that is, are not used to accelerate and convey the particles. The above described method of introducing material into a pneumatic conveying system is also unsuited, as a practical matter, for conduits of relatively large cross-section since the desired uniform dispersion of the particles in the conveying gas flow is virtually impossible to obtain with reasonable particle acceleration distances, gas flow rates and velocities, and energy inputs.

The disadvantages of the above-described and other methods and apparatus are overcome, in acccordance with the invention, by a novel and improved method and apparatus for introducing particulate material into an elevating pneumatic conveying system which involves fluidizing the particulate material exteriorly of the conveying gas flow and introducing it into the conveying gas flow with a substantial component of initial velocity perpendicular to the direction of the flow. Preferably, the material also has a significant component of initial velocity in the direction of the conveying gas flow.

More particularly, the method of the invention comprises the steps of forming a fluidized bed of the particulate material, preferably in a chamber which surrounds the conveying conduit, and continuously conducting the fluidized material from the lower portion of the bed generally radially inwardly into the conveying gas flow from points about the perimeter thereof. The fluidized material is discharged with a substantial inward component of velocity which is created by the pressure head of the fluid bed and any pressure differential between the conveying conduit and the region above the fluidized bed. Preferably, a significant component of velocity in the direction of the conveying gas flow is established by the action of the upwardly moving fluidizing gas on the particles just prior to their discharge into the conveying gas flow. Further, it is desirable to utilize the exhaust fluidizing gas and any air or gas entering the fluidizing chamber with the particulate material to convey the particulate material through the conduit by withdrawing the incoming air or gas and the exhaust fluidizing gas, which is usually air, from the region of the fluidizing chamber above the fluidized bed and introducing them into the conveying gas flow upstream of the point where the fluidized particulate material is introduced.

The apparatus of the invention forms a fluidized bed of the particulate material exteriorly of the conveying gas flow and conducts the fluidized material from a lower portion of the bed into the conveying gas flow. Preferably, the fluidized bed is formed in a chamber which surrounds the conduit, the conduit having one or more orifices, such as a peripheral slot in the conduit, communicating the lower end of the chamber with the conduit. A predetermined flow of the fluidized particulate material from the chamber through the orifice is obtained by use of a member which has an edge spaced a predetermined distance from an edge of the orifice to provide a passage of predetermined cross-section through which the material flows from the chamber and thence through the orifice.

In the lower part of the chamber and closely adjacent the orifice is a porous member, and gas is delivered into the portion of the chamber below the member. The gas, which is usually air, is diffused through the member and flows upwardly through the chamber to fluidize particulate material introduced to the chamber. By placing the porous member in close relation below the orifice, the fluidizing gas adjacent the permieter of the conveying conduit imparts a component of velocity to the fluidized particulate material being discharged into the conduit which is in the direction of the conveying gas flow through the conduit.

A second conduit of substantially smaller section than the conveying conduit and axially aligned therewith may be provided to deliver any material settling out of the conveying gas flow and collecting in the lower portion of the plenum chamber into the conveying gas flow. More particularly, the lower end of the second conduit is located close to the lower portion of the plenum chamber walls, and an opening aligned with the second conduit is provided in the plenum chamber, the opening being open to the atmosphere. (It will be understood by those skilled in the art that this feature of the apparatus is generally utilizable only in a negative pressure, closed circuit conveying system, unless a source of pressure higher than that in the system is used to reinject the material.)

Guides provided at the plenum chamber opening direct atmospheric air through the opening into the second conduit, this air picking up material entering the opening from the lower walls of the plenum chamber, which are preferably conical in shape, and carrying that material into the main conveying conduit.

In the method and apparatus of the invention, the particulate material is substantially uniformly dispersed immediately upon being introduced into the conveying gas flow. Thus, there is little tendency of the material to collect or agglomerate in relatively widely spaced clusters. Furthermore, the material has no significant downward component of initial velocity, the material being introduced with a substantial component of velocity perpendicular to the direction of the conveying gas flow in the conduit, and also, preferably, with a substantial component in the direction of the flow. Thus, the flow rates and velocities of the conveying gas and the particle acceleration distances are substantially lower in the method and apparatus of the invention than in presently known systems. Reductions of 50% or more in both the flow rate and velocity of conveying gas, as compared to presently known systems of comparable capacity, can be obtained with the method and apparatus of the invention.

For a better understanding of the invention, reference may be made to the following description of exemplary embodiments taken in conjunction with the figures of the accompanying drawings, in which:

FIGURE 1 is an elevational view in section of a preferred embodiment of the apparatus;

FIG. 2 is a top view of the apparatus of FIG. 1, portions being broken away to illustrate the interior elements more clearly;

FIG. 3 is a view in section on an enlarged scale with respect to FIG. 1 of a segment of a porous member and the adjacent portions of the fluidizing chamber of the apparatus; and FIG. 4 is a sectional view of a segment of the porous member and its mounting taken generally along the line 4—4 of FIG. 3 and in the direction of the arrows.

In the embodiment of the invention illustrated in the drawings, only the portion of the conveying system where the particulate material is introduced is shown. The apparatus and method of the invention are suitable for many types of elevating pneumatic conveying or feeding systems for particulate material. For example, the particulate material may be the product of a grinding operation which is delivered by the pneumatic conveyor to classifying apparatus. The conveyor may be a closed circuit type in which the entire system is at a pressure below atmospheric pressure, thereby retaining dust entirely within the system without elaborate seals. It will nevertheless be understood by those skilled in the art that the apparatus and method of the invention are well suited for other types of conveying or feeding systems in which particulate material is to be introduced into a generally vertical flow of conveying gas.

Referring to FIG. 1, the apparatus includes a conveying conduit 10 which is made up of a cylindrical main upper section 10a, only the lower portion of which is illustrated, and a cylindrical lower section 10b which is spaced from the section 10a and thus defines therewith a peripheral slot 12. Disposed within the lower section 10b of the conveying conduit 10 are a plurality of annular, concentric guide vanes 13 to 16 which are arranged to provide the desired gas velocity profile across the cross-section of the conduit 10. As best seen in FIG. 2, the lower portion of the conduit 10 is also subdivided into a plurality of separate longitudinally extending passages by radial plates 18 which extend from the lower end of the lower section 10b and part-way up the upper section 10a. The conduit sections 10a and 10b, the concentric guide means 13 to 16 and the radial plates 18 are welded together as a unit and are mounted on beams 22 carried by supporting legs 24.

Surrounding the lower part of the conduit 10 and extending somewhat below the lower ends of the guide vanes 13 to 16 is a plenum chamber 26 which consists of an upper generally cylindrical wall 26a and a lower conical wall 26b. At the lower end of the conical wall 26b is an opening 28, and carried on a frame 30 below the conical portion 26b is a frustum-shaped guide member 32. The opening 28 in the plenum chamber section 26b is of substantially the same size as a relatively small diameter conduit 34 which extends axially through the lower portion of the conveying conduit 10. The lower end of the small conduit 34 carries a sleeve 36 which is adjusted vertically to provide a predetermined space between its lower edge and the adjacent surface of the conical section 26b of the plenum chamber 26.

A flow of conveying gas is introduced generally laterally into the plenum chamber 26 through an inlet duct 38 by a fan 40. The flow of conveying gas, which will usually be air but may also be an inert or any other suitable gas, is controlled by dampers 41 installed adjacent the point where the inlet duct 38 enters the plenum chamber 26. Additionally, when the apparatus of the invention is utilized in a semi-closed negative pressure air system (that is, a system operating at a pressure below atmospheric pressure), an outlet vent 42 is provided for coupling suitable exhaust means (not shown) to the system for maintaining the system at a predetermined pressure. The amount of air withdrawn through the outlet is controlled by dampers 44 in the outlet duct 42. The air or other conveying gas delivered by the fan 40 to the plenum chamber 26 flows through the guide vanes 13 to 16 and upwardly through the longitudinal segments defined within in the conveying conduit 10.

Generally surrounding the lower part of the upper conduit section 10a and disposed within the plenum chamber is a fluidizing chamber 50, which comprises an upper cylindrical wall 52, a lower cylindrical wall 54, a top cover 56, which is preferably removable to facilitate cleaning out the chamber when desired, and a base member 57. The conduit 10 constitutes the inner wall of the fluidizing chamber. Between the upper and lower cylindrical walls 52 and 54 of the fluidizing chamber 50 is a labyrinth seal arrangement 60.

Particulate material is introduced into the fluidizing chamber 50 by a slide trough 62 which consists of a lower chamber 64, a porous member 66 spaced from the bottom chamber 64 and a cover or hood 68. In the illustrated embodiment, it will be noted that the delivery trough slopes rather gently into the chamber 50, and accordingly, air is delivered through a conduit 70 into the chamber below the porous member 66, the air serving to agitate the material carried on the porous member 66 and enable it to slide along the member 66 into the fluidizing chamber 50. A deflector 72 is vertically disposed in the chamber 50 adjacent the discharge end of the slide trough 62.

Referring next to FIGS. 3 and 4, an annular plate 80 is installed in the fluidizing chamber 50. The plate is made of a suitable porous material, many of which are known to those skilled in the art, for passing and diffusing air to form a fluidized bed of particulate material thereabove. The plate 80 is carried by flanged, radially disposed members 82 secured in the lower part of the chamber 50, angles 83 fastened to the wall 54 and angles 84 fastened to the upper end of the segment 10b of the conveying conduit 10. Seals 85 to 87 are provided for preventing communication of fluidizing gas between the portions of the fluidizing chamber above and below the porous plate 80 other than through the plate. While the member 82 illustrated in FIG. 3 is cut out to provide an opening 88 therein for communicating the circumferential portions of the chamber between the members 82 with each other, some of the members do not have openings so that the part of the fluidizing chamber below the porous plate 80 is subdivided into several separate circumferential compartments.

A fluidizing gas, which will usually be air, is delivered under pressure through a conduit 92 into each of the circumferential compartments and diffuses through the porous plate 80 and flows upwardly to form a fluidized bed of the particulate material in the chamber 50. The nature and amount of particulate material fed into the chamber and the quantity and pressure of fluidizing gas are such that the level of the fluidized bed formed in the chamber 50 has an elevation slightly below the upper end of the lower wall member 54 of the chamber 50. The fluidizing gas and the gas supplied to the slide trough chamber 64 are delivered by a fan 94 through piping 96.

Surrounding and spaced a small distance outwardly of the lower portion of the conduit main section 10a is a sleeve 100 which has an inwardly and downwardly disposed conical flange 102 at its lower end. The sleeve 100 is mounted at its upper end on brackets 104 having a sloping slot which receives a pin fixed on the conduit. The sleeve is thus arranged to be adjusted up and down by rotating it so as to provide a passage of predetermined width between the lower edge 102a of the flange 102 and the upper surface of the porous plate 80, as best shown in FIG. 3. This passage constitutes a peripheral orifice through which fluidized particulate material from the bed flows at a predetermined rate into the upwardly moving conveying gas in the conduit 10. The pressure head of the fluidized bed and the higher pressure of the gas above the bed than the gas flowing in the conduit imparts a substantial component of velocity to the particulate material in a direction perpendicular to the conveying gas flow in the conduit. The initial velocity of the particles as they enter the conduit is estimated to be in the range of 1000 f.p.m.

Referring to FIG. 3, it will be noted that the inner edge 80a of the porous plate 80 lies in the plane of the inner surfaces of the conduit sections 10a and 10b and that the lower edge 102a of the conical sleeve flange 102 is spaced radially outward of that plane. Thus, fluidizing gas diffusing through the porous plate 80 in the peripheral zone adjacent the edge 80a flows generally in the direction represented by the arrows (designated G in FIG. 3) and imparts a substantial vertical component of velocity to the particles as they enter the conduit 10.

In operation of the above-described embodiment of the invention, a gas, which will normally be air, is blown into the plenum chamber by the fan 40 at a controlled rate and velocity and flows from the plenum chamber through the guide vanes 13 to 16 and upwardly through the conduit 10. Particulate material is delivered at a predetermined rate onto the slide trough 60 and showers off the end of the trough downwardly into the fluidized bed of material established in the chamber 50 by the upward flow of gas above the porous member 80. Fluidized particulate material flows from the fluidized bed in the chamber 50 through the orifice provided between the lower edge 102a of the flange and the upper surface of the porous plate 80 with substantial radially inward and upward components of velocity into the gas moving up through the conduit 10. Because the particles of material are in a fluidized, relatively uniformly dispersed suspension immediately upon being introduced into the gas flow in the conduit 10, and because they are delivered in a generally inward and upward direction into the conduit, the flow rate and velocity of the conveying gas is significantly reduced, as compared to methods of introducing particulate material into the gas flow in which there is a downward velocity component and wherein the material is not already diffused.

The exhaust fluidizing gas in the chamber 50 above the bed, any air coming into the chamber 50 with the particulate material, and material, such as dust and fines, suspended above the bed are withdrawn, because of the pressure drop between the fluidizing chamber and the plenum chamber, through the labyrinth seal 60 and into the plenum chamber and flow into and upwardly in the conduit 10. Any particulate material which settles out of the conveying gas, or which leaks out of the fluidizing chamber through the seal 60 into the plenum chamber will flow down the conical wall segment 26b and into the space between the edge of the opening 28 and the conical guide element 32. Air is being drawn through the opening into the small diameter conduit 34 and carries with it particulate material moving into the opening upwardly into the main conveying conduit section 10a thereby reinjecting it into the system.

Pneumatic conveying apparatus corresponding in all significant respects with that illustrated in the drawings has been used to elevate into classifying apparatus ground phosphate rock fed at a rate of 5 tons per minute into the fluidizing chamber from a ball mill. The phosphate had an average particle size of about 100 mesh and no particle was greater than ⅜ inch. A fluidized bed of the particulate phosphate was formed to a height of about 24 inches in the fluidizing chamber, which had a width of 15 inches, by a fluidizing air flow of 50 c.f.m. per square foot of porous plate.

The sleeve 100 was set to provide a ⅜ inch peripheral orifice between the edge 102a thereof and the surface of the plate. The conduit size was 49 inches and the conveying air flowed past the orifice at a velocity of about 4500 f.p.m. and a flow rate of 55,000 c.f.m. The pressure in the conduit was approximately −3 inches of water while the pressure above the fluidized bed was close to atmospheric pressure. Entirely satisfactory infeed and conveying of the particulate phosphate were obtained.

It will be understood by those skilled in the art that the above described embodiment of the invention is merely exemplary and that many modifications and variations of it may be made by those skilled in the art without departing from the spirit and scope of the invention. All such variations and modifications are intended to be within the scope of the invention as defined in the appended claims.

I claim:

1. Pneumatic conveying apparatus for conveying particulate material comprising a generally vertically aligned conduit having a slot extending about the periphery thereof, means for producing an upward flow of conveying gas through the conduit, means defining a chamber surrounding the conduit with its lower end disposed adjacent the slot and in communication therewith, means for feeding particulate material into the chamber, a porous member disposed above the lower end of the chamber and closely adjacent the conduit slot, means for introducing a gas into the chamber below the porous member, whereby the gas diffuses through the member and flows upwardly therethrough to produce a fluidized bed of particulate material therein, and a sleeve surrounding the conduit, the sleeve having an edge overlying and closely adjacent the slot and spaced a predetermined distance from the porous member and from an edge of the conduit slot so as to provide a passage of predetermined dimension for conducting the fluidized particulate material therethrough at a predetermined rate radially inward into the conveying gas flow with a substantial component of velocity perpendicular to the direction of the conveying gas flow.

2. Pneumatic conveying apparatus according to claim 1 wherein the porous member extends into the slot and its inner edge lies generally in the plane of the inner surface of the conduit, and wherein the said edge of the sleeve is spaced outwardly from the inner edge of the porous member, whereby the fluidizing gas flowing upwardly in the region of the said passage imparts a vertical component of velocity to the particulate material as it passes therethrough.

3. Pneumatic conveying apparatus according to claim 1 wherein the portion of the chamber below the porous member includes means dividing it into a plurality of non-communicating segments and wherein means is provided for introducing fluidizing gas into each of the segments to facilitate maintaining a fluidized bed of the particulate material of substantially uniform predetermined height.

4. Pneumatic conveying apparatus according to claim 1 further comprising means for conducting the exhaust fluidizing gas and any particulate material entrained therein from the portion of the chamber above the fluidized bed into the conveying gas flow.

5. Pneumatic conveying apparatus for conveying particulate material comprising a generally vertically disposed conveying conduit having an open lower end and a peripheral slot spaced from the lower end, means defining a plenum chamber surrounding the lower portion of the conduit and extending below the lower end of the conduit, means defining a fluidizing chamber within the plenum chamber and in communication with the conduit slot, means facilitating the introduction of particulate material into the fluidizing chamber, means for forming a gas-fluidized bed of particulate material in the fluidizing chamber, means for conducting fluidized particulate material out of the fluidizing chamber and through the conduit slot into the conduit at a predetermined rate with a substantial radially inward component of initial velocity and a substantial component of velocity in a generally upward direction, means communicating with the plenum chamber for providing a flow of conveying gas into the phenum chamber and upwardly through the conduit, and outlet means on the fluidizing chamber for conducting exhaust fluidizing gases and any particulate material entrained therein out of the fluidizing chamber into the plenum chamber.

6. Pneumatic conveying apparatus according to claim 5 comprising a plurality of guide vanes adjacent the lower end of the conveying conduit for providing a predetermined velocity profile in the conveying gas flow therethrough.

7. Pneumatic conveying apparatus according to claim 5 comprising a plurality of longitudinally extending radial vanes in the lower portion of the conduit for limiting turbulence in the conveying gas flow in the region where the fluidized particulate material is introduced.

8. Pneumatic conveying apparatus according to claim 5 wherein the means for forming a gas-fluidized bed of particulate material includes a porous member in the fluidizing chamber spaced from the lower end thereof and disposed closely adjacent the conveying conduit slot, and means for introducing fluidizing gas into the chamber below the porous member.

9. Pneumatic conveying apparatus according to claim 5 wherein the means for conducting fluidized particulate material into the conduit at a predetermined rate includes a sleeve having an edge overlying the slot in the conduit and spaced a predetermined distance from an edge of the slot, thereby providing a passage of predetermined width through which the fluidized particulate material flows generally radially and upwardly into the conduit.

10. Apparatus according to claim 5 comprising a second conduit of substantially lesser cross-section than the conveying conduit and axially aligned therewith, the second conduit having an open lower end spaced substantially below the lower end of the conveying conduit and disposed closely adjacent the lower part of the plenum chamber walls, an opening in the lower portion of the plenum chamber walls of generally the same size as the second conduit and aligned therewith, a guide element disposed below the second conduit for guiding air at a pressure above that of the conveying gas from outside the plenum chamber into the peripheral zone adjacent the inner surface of the second conduit, whereby particulate material entering and settling on the bottom of the plenum chamber is picked up by air flowing into the second conduit from exteriorly of the plenum chamber.

11. In pneumatic conveying apparatus for conveying particulate material which includes a generally vertically aligned conduit having an open lower end and means for providing a flow of conveying gas upwardly through the conduit, the combination therewith of means for introducing the particulate material into the conduit comprising means for fluidizing the particulate material exteriorly of the conveying gas flow, orifice means located above the open end of the conduit for conducting the fluidized particulate material laterally into the conveying gas flow, and means for collecting any material not immediately picked up but settling out of the conveying gas flow and reinjecting it into the conduit.

12. Apparatus according to claim 11 wherein the collecting and reinjecting means includes a second conduit extending from within the first conduit to a point substantially below the lower end of the first conduit and in communication with a source of a gas at a pressure substantially above the pressure of the conveying gas, and wall means defining a collecting chamber, the lower end of the second conduit being spaced a predetermined distance from the wall of the collecting chamber, whereby particulate material passes through the space between the conduit and wall and is picked up in the gas flowing upwardly in the second conduit from the higher pressure source.

13. Apparatus according to claim 12 wherein the reinjecting means further includes a guide element disposed below the second conduit for guiding the higher pressure gas past the space between the lower end of the second conduit and the wall of the collecting chamber at a predetermined velocity.

14. Apparatus according to claim 11 wherein the collecting and reinjecting means includes a second conduit of substantially lesser cross-section than that of the first conduit and axially aligned therewith, the second conduit extending from a point within the first conduit and having its lower end spaced substantially below the lower end of the first conduit, wall means defining a collecting chamber and having a lower portion tapered downwardly and inwardly toward the lower end of the second conduit, the lower portion of the collecting chamber having an opening of generally the same size as and aligned with the second conduit, and a source of pressure above that of the conveying gas communicating with the opening of the collecting chamber and lower open end of the conduit, whereby particulate material falling out of the conveying gas flow and settling on the bottom of the collecting chamber is picked up in the higher pressure gas flowing into the second conduit and is conveyed upwardly thereby and reinjected into the first conduit.

15. Apparatus according to claim 11 wherein the collecting and reinjecting means includes a second conduit extending from a point within the first conduit to a point substantially below the lower end of the first conduit, means defining a collecting chamber having a lower portion formed to guide material collecting therein toward the lower open end of the second conduit, the lower end of said second conduit being spaced a predetermined distance from the adjacent collecting chamber wall, means defining an opening in the lower chamber wall substantially aligned with the said lower open end of the second conduit, and means for conducting a gas through the opening in the collecting chamber wall past the space between the collecting chamber wall and the said lower end of the conduit at a velocity sufficient to pick up material passing through the said opening and convey it upwardly in the second conduit and reinject it into the conveying gas flow.

References Cited by the Examiner
UNITED STATES PATENTS

| | | | |
|---|---|---|---|
| 2,412,152 | 12/1946 | Huff | 302—53 |
| 2,602,707 | 7/1952 | Garontte | 302—53 |
| 2,765,265 | 10/1956 | Bourguet et al. | 302—53 |
| 2,921,818 | 1/1960 | Verwey et al. | 302—53 |
| 2,924,489 | 2/1960 | Beckmann | 302—53 |
| 3,003,821 | 10/1961 | Marchand | 302—53 |

ANDRES H. NIELSEN, *Primary Examiner.*